United States Patent
Maki

(10) Patent No.: US 8,149,465 B2
(45) Date of Patent: Apr. 3, 2012

(54) COLORING IMAGE GENERATING APPARATUS AND COLORING IMAGE GENERATING METHOD FOR GENERATING A COLORING IMAGE FROM AN IMAGE USING AN EDGE INTENSITY FREQUENCY DISTRIBUTION OF THE IMAGE

(75) Inventor: Yoichiro Maki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 330 days.

(21) Appl. No.: 12/383,610

(22) Filed: Mar. 26, 2009

(65) Prior Publication Data
US 2009/0244660 A1   Oct. 1, 2009

(30) Foreign Application Priority Data
Mar. 26, 2008 (JP) .................. 2008-079682

(51) Int. Cl.
*H04N 1/407* (2006.01)
(52) U.S. Cl. ........ 358/3.27; 358/1.9; 358/501; 358/518; 358/537; 382/199; 382/266; 382/269
(58) Field of Classification Search .................. None
See application file for complete search history.

(56) References Cited

U.S. PATENT DOCUMENTS

| | | | | |
|---|---|---|---|---|
| 5,784,500 A * | 7/1998 | Homma et al. | ............... | 382/270 |
| 6,757,444 B2 * | 6/2004 | Matsugu et al. | ............... | 382/283 |
| 7,085,379 B1 * | 8/2006 | Kagechi et al. | ............... | 382/166 |
| 7,298,896 B2 * | 11/2007 | Yamaguchi et al. | .......... | 382/172 |
| 7,366,347 B2 * | 4/2008 | Song et al. | ..................... | 382/162 |
| 7,623,712 B2 * | 11/2009 | Dai et al. | ....................... | 382/180 |
| 7,697,044 B2 * | 4/2010 | Mishina | ........................ | 348/252 |
| 2002/0071131 A1 * | 6/2002 | Nishida | ........................... | 358/1.9 |
| 2003/0099397 A1 * | 5/2003 | Matsugu et al. | .............. | 382/173 |
| 2006/0010582 A1 * | 1/2006 | Nagahashi et al. | ............... | 2/425 |

FOREIGN PATENT DOCUMENTS

| | | |
|---|---|---|
| JP | 6301779 A | 10/1994 |
| JP | 2006-185017 A | 7/2006 |
| JP | 2009-32178 | 2/2009 |

* cited by examiner

*Primary Examiner* — King Poon
*Assistant Examiner* — Dung Tran
(74) *Attorney, Agent, or Firm* — Nuter McClennen & Fish LLP; John J. Penny, Jr.; Christina M. Sperry

(57) ABSTRACT

A coloring image generating apparatus includes: an acquiring unit that acquires an image; an edge intensity calculating unit that calculates an edge intensity frequency distribution of the image; a threshold value setting unit that sets a threshold value for dividing a coloring image into a contour portion and a blank portion according to distribution characteristics of the edge intensity frequency distribution; and a generating unit that discriminates the contour portion from the blank portion in the image on the basis of the threshold value and generates a coloring image.

16 Claims, 13 Drawing Sheets

COLORING IMAGE GENERATING APPARATUS AND COLORING IMAGE GENERATING METHOD FOR GENERATING A COLORING IMAGE FROM AN IMAGE USING AN EDGE INTENSITY FREQUENCY DISTRIBUTION OF THE IMAGE

BACKGROUND

1. Technical Field

The present invention relates to a coloring image generating apparatus and a coloring image generating method for generating a coloring image from an image.

2. Related Art

Coloring image generating apparatuses have been known which generate coloring images from images. For example, a coloring image generating apparatus has been proposed which performs image processing, such as a blurring process, on the basis of image acquiring conditions, such as read resolution, or image conditions, such as the number of lines in an image, and detects a line area of the image to generate a coloring image (JP-A-2007-197584).

However, images, which are coloring image sources, have different edge amounts and brightness distributions. When the line area of the image is detected to generate a coloring image, the quality of a coloring image depends on a threshold value for dividing a coloring image into a contour portion and a blank portion. For example, a coloring image having a large number of contour portions or a defective coloring image in which a contour is cut is generated according to the threshold value.

SUMMARY

An advantage of some aspects of the invention is that it provides a technique capable of generating a good coloring image from an image.

According to a first aspect of the invention, a coloring image generating apparatus includes: an acquiring unit that acquires an image; an edge intensity calculating unit that calculates an edge intensity frequency distribution of the image; a threshold value setting unit that sets a threshold value for dividing a coloring image into a contour portion and a blank portion according to distribution characteristics of the edge intensity frequency distribution; and a generating unit that discriminates the contour portion from the blank portion in the image on the basis of the threshold value and generates a coloring image.

According to the coloring image generating of the above-mentioned first aspect, the threshold value for dividing a coloring image into a contour portion and a blank portion is set according to the distribution characteristics of the edge intensity frequency distribution. Therefore, it is possible to generate a good coloring image.

In the coloring image generating apparatus according to the first aspect of the invention, when a distribution is concentrated on a high edge intensity region in the edge intensity frequency distribution, the threshold value setting unit may set the threshold value such that the contour portions of the coloring image are reduced. When the distribution is concentrated on a low edge intensity region, the threshold value setting unit may set the threshold value such that the contour portions of the coloring image are increased. According to this structure, a coloring image having a small number of contour portions can be generated from an image in which a distribution is concentrated on a high edge intensity region, and a coloring image having a large number of contour portions can be generated from an image in which a distribution is concentrated on a low edge intensity region. Therefore, it is possible to generate a good coloring image.

In the coloring image generating apparatus according to the first aspect of the invention, the generating unit may generate the coloring image using a portion of the image having an edge intensity that is more than the threshold value as the contour portion and another portion of the image having an edge intensity that is less than the threshold value as the blank portion. According to this structure, a portion of the image having an edge intensity that is more than the threshold value is used as the contour portion and another portion of the image having an edge intensity that is less than the threshold value is used as the blank portion. Therefore, it is possible to generate a good coloring image.

In the coloring image generating apparatus according to the first aspect of the invention, the threshold value setting unit may include a plurality of set values each indicating the percentage of a cumulative value of the frequencies from a maximum value of the edge intensity to the threshold value in the total number of frequencies in the edge intensity frequency distribution. The threshold value setting unit may select one of the set values according to the distribution characteristics of the edge intensity frequency distribution, thereby setting the threshold value. According to this structure, one of the set values can be selected according to the distribution characteristics of the edge intensity frequency distribution, thereby setting the threshold value.

In the coloring image generating apparatus according to the first aspect of the invention, the threshold value setting unit may select the set value on the basis of a determination value obtained by applying a determining filter to the edge intensity frequency distribution. According to this structure, it is possible to set the threshold value by determining the distribution characteristics of the edge intensity frequency distribution using the determining filter.

In the coloring image generating apparatus according to the first aspect of the invention, the acquiring unit may acquire the image using a plurality of input units. When the image is acquired by a scanner, the threshold value setting unit may set the threshold value such that the contour portions of the coloring image are larger than that when the image is acquired by the other input units. According to this structure, it is possible to change the setting of the threshold value for the image acquired by the scanner. Therefore, it is possible to generate a good coloring image.

In the coloring image generating apparatus according to the first aspect of the invention, the threshold value setting unit may determine whether the image is suitable for a coloring image on the basis of the determination value. According to this structure, it is possible to determine whether the image is suitable for a coloring image by determining the distribution characteristics of the edge intensity frequency distribution using the determining filter.

The invention is not limited to the coloring image generating apparatus, but can be applied to various aspects, such as a printing apparatus (printer), an image display apparatus (viewer), an image determining method using a computer, and a computer program. In addition, various modifications and changes of the invention can be made without departing from the scope and spirit of the invention. For example, the invention can be applied to a coloring image manufacturing method.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a printer, which is an example of a coloring image generating apparatus according to exemplary embodiments of the invention will be described with reference to the accompanying drawings.

A. First Embodiment

A1. Structure of Printer

Figure 1:
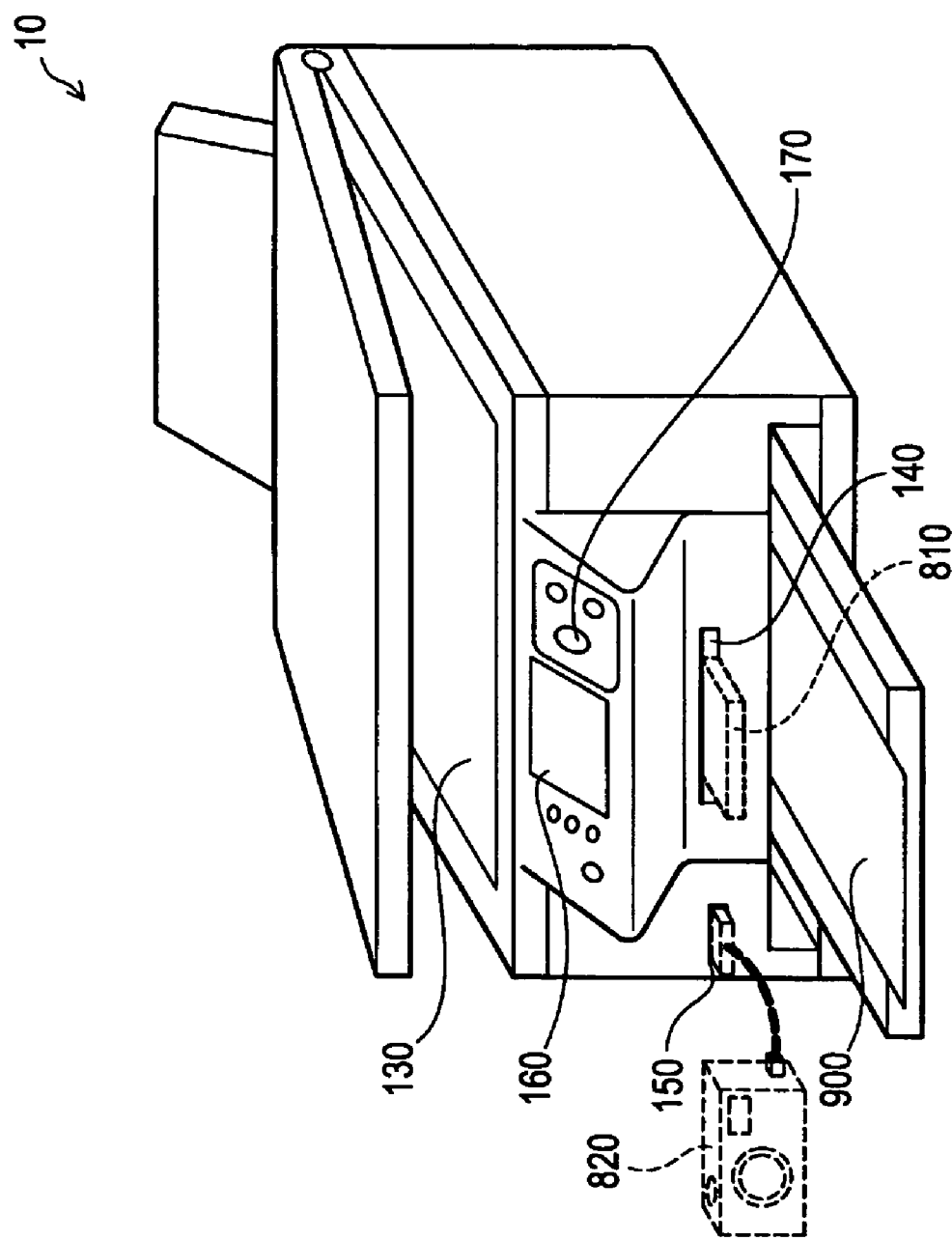
FIG. 1 is a diagram illustrating the external structure of a printer according to an embodiment of the invention.

FIG. 1 is a diagram illustrating an example of the external structure of a printer according to a first embodiment. A printer 10 is an ink jet printer that ejects ink droplets onto a printing medium 900, such as a sheet, and prints characters or images, such as coloring images. In this embodiment, the printer 10 is a so-called multi-function machine having various functions, such as a scanner function and a copier function. The printer 10 includes a scanner 130, a card slot 140, a communication connector 150, a display 160, and a control panel 170.

The scanner 130 reads a document loaded on a document table. The card slot 140 is an interface that is connected to a memory card 810 having a recording medium, such as a flash memory or a small hard disk, provided therein so as to perform data communication therewith. The communication connector 150 is an interface that is connected to an external apparatus 820, such as a personal computer, a digital still camera, or a digital video camera, so as to perform data communication therewith. The display 160 displays characters or images to the user of the printer 10. The control panel 170 receives instructions from the user of the printer 10.

The printer 10 acquires image data from the scanner 130, the card slot 140, and the communication connector 150, and prints an image on the basis of the image data. In this embodiment, the printer 10 performs a coloring image generating process on the basis of the acquired image data, and prints a generated coloring image. The coloring image generating process will be described below.

Figure 2:
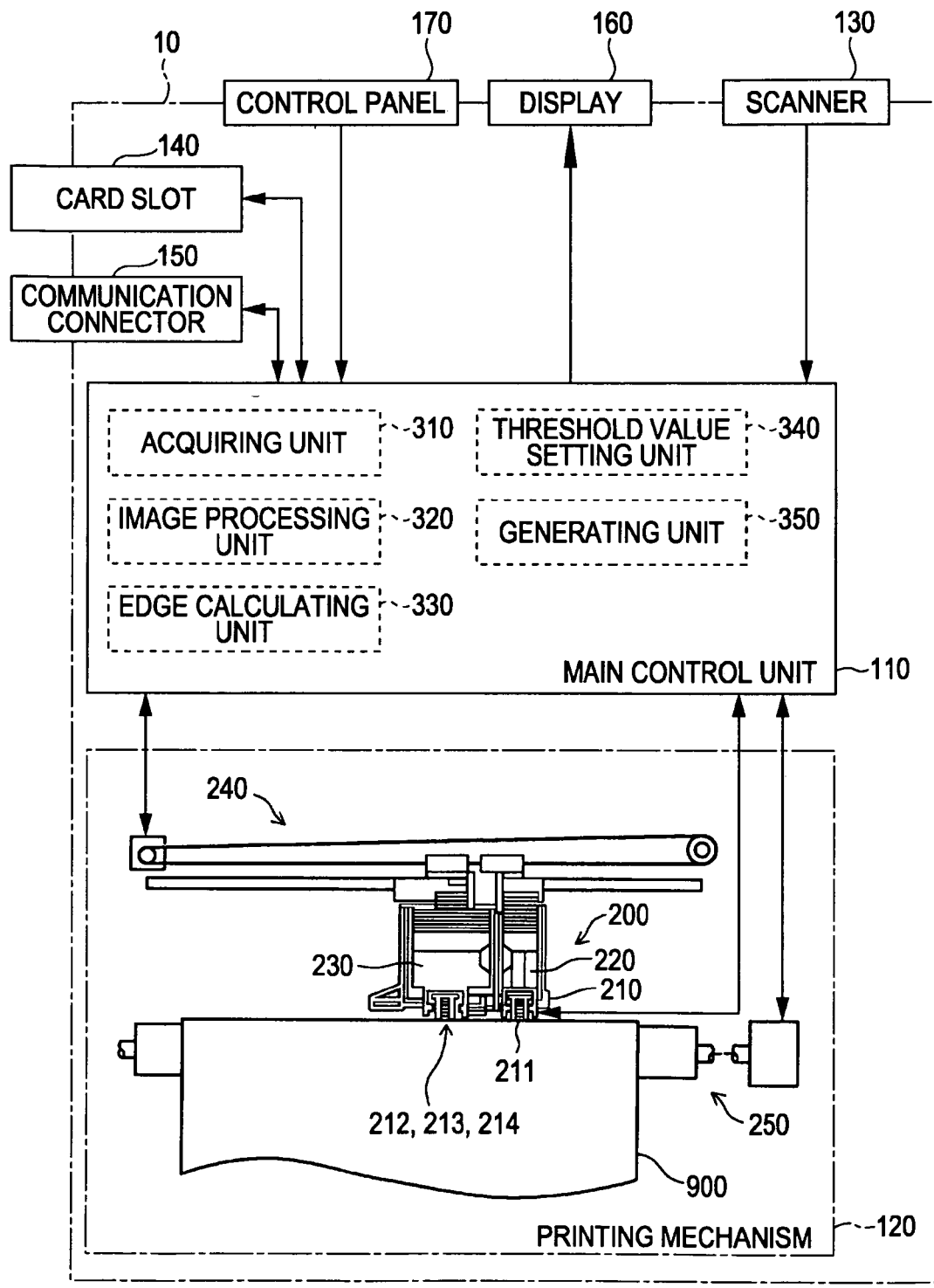
FIG. 2 is a diagram illustrating the internal structure of the printer according to this embodiment.

FIG. 2 is a diagram illustrating an example of the internal structure of the printer according to this embodiment. The printer 10 includes a main control unit 110 and a printing mechanism 120 provided therein. The main control unit 110 is composed of an ASIC (application specific integrated circuit) having hardware components, such as a CPU and a memory, and controls all components of the printer 10. The main control unit 110 controls the CPU to process modules stored in a memory, thereby implementing the functions of an acquiring unit 310, an image processing unit 320, an edge calculating unit 330, a threshold value setting unit 340, and a generating unit 350. In this embodiment, the functional units are implemented in a software manner, but they may be implemented in a hardware manner by a physical circuit structure.

The acquiring unit 310 acquires image data from a document loaded on the document table of the scanner 130, the memory card 810 connected to the card slot 140, or the external apparatus 820 connected to the communication connector 150. The image processing unit 320 performs image processing, such as dot processing or gamma conversion, on the image data acquired by the acquiring unit 310. The edge calculating unit 330 performs an edge calculating process, which will be described below, on the image data processed by the image processing unit 320 to calculate the edge intensity of the image and a histogram of the edge intensity (an edge intensity frequency distribution, which will be described below). The threshold value setting unit 340 performs an edge intensity distribution determining process, which will be described below, to set a threshold value for dividing a coloring image into a contour portion and a blank portion on the basis of the edge intensity frequency distribution calculated by the edge calculating unit 330. The generating unit 350 generates a coloring image on the basis of the threshold value set by the threshold value setting unit 340. In addition, the generating unit instructs the printing mechanism 120 to print the generated coloring image.

As shown in FIG. 2, the printing mechanism 120 includes a head unit 210, a carriage 200, a carriage driving unit 240, and a transport unit 250. The head unit 210 of the printing mechanism 120 includes a total of four ejection heads 211, 212, 213, and 214 corresponding to black (K), cyan (C), magenta (M), and yellow (Y) inks. The voltage of a piezoelectric element (not shown) is adjusted to eject ink from each of the ejection heads 211 to 214. In this embodiment, the printer 10 uses four color inks to perform printing, but the kinds or the number of color inks used may be different from the above. The carriage 200 holds the head unit 210. The carriage driving unit 240 drives the carriage 200 in a main scanning direction above the printing medium 900. The transport unit 250 transports the printing medium 900 in a sub-scanning direction that intersects the main scanning direction in which the carriage 200 is moved. The ejection heads 211 to 214, the carriage driving unit 240, and the transport unit 250 are operated in cooperation with each other to print an image on the printing medium 900 on the basis of instructions from the main control unit 110.

A2. Operation of Printer

Figure 3:
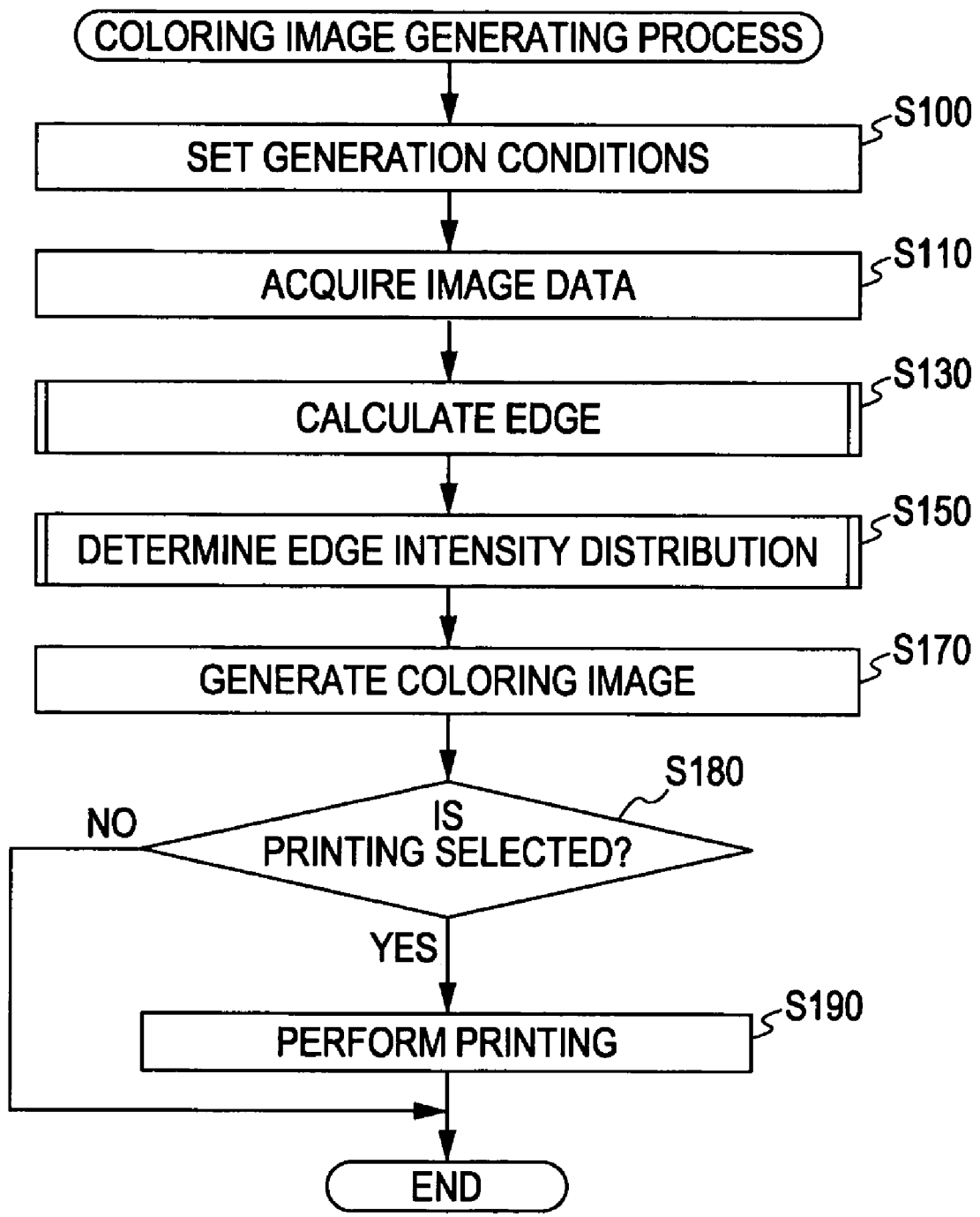
FIG. 3 is a flowchart illustrating a coloring image generating process.

FIG. 3 is a flowchart illustrating the coloring image generating process. The invention is characterized by the coloring image generating process performed by the main control unit 110. When a user uses to the control panel 170 to input a request for performing the coloring image generating process, the main control unit 110 starts the coloring image generating process shown in FIG. 3.

When the coloring image generating process shown in FIG. 3 starts, the main control unit 110 performs a generation condition setting process to set the generation conditions of a coloring image (Step S100). The generation conditions of a coloring image set by the generation condition setting process includes, for example, selecting whether to read image data, which is a generation target, from the scanner 130 or to use image data stored in the memory card 810 or the external apparatus 820, selecting target image data when a plurality of image data is stored in the memory card 810 or the external apparatus 820, selecting read resolution when image data is acquired and a printing sheet to be output, selecting a print size, selecting the number of pages, and selecting print quality. In this embodiment, the user uses the control panel 170 to set the generation conditions in the generation condition setting process. However, as another embodiment, the generation conditions may be set by data read from the scanner 130, the connection of the memory card 810 to the card slot 140, and the connection of the external apparatus 820 to the communication connector 150, without being set by the user. In addition, the generation conditions may include the display of a preview image on the display 160 and the designation of the range of a coloring image generating target.

After the generation condition setting process is performed (Step S100), the main control unit 110 acquires image data, which is a coloring image generating target, under the generation conditions set by the generation condition setting process (Step S110). The main control unit 110 acquires image data as R, G, and B raster data and expands the data on the memory.

After the image data is acquired (Step S110), the main control unit 110 performs an edge calculating process that detects an edge intensity distribution from the acquired image data (Step S130).

Figure 4:
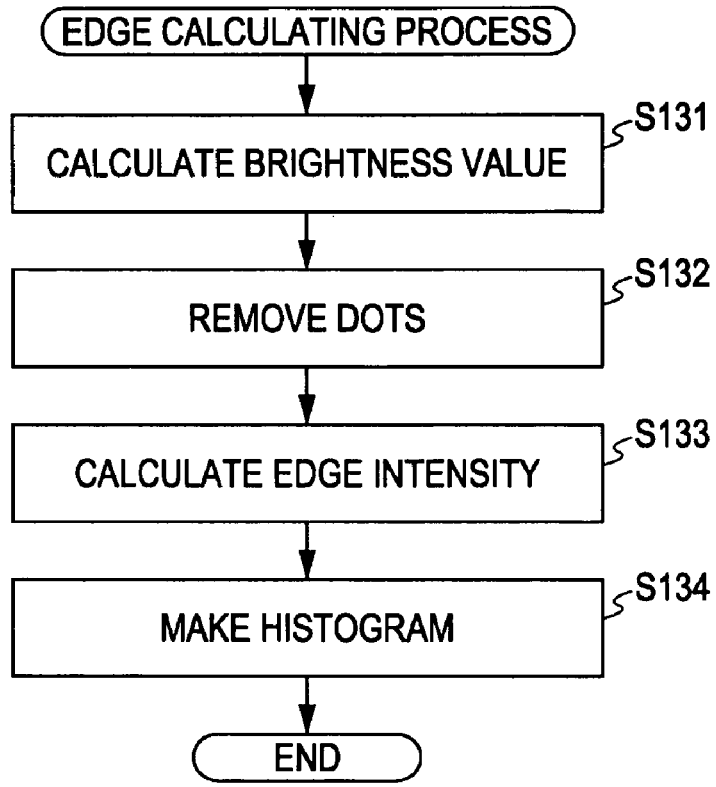
FIG. 4 is a flowchart illustrating an edge calculating process.
Figure 5:
FIG. 5 is a diagram illustrating an example of an image.

FIG. 4 is a flowchart illustrating the edge calculating process. FIG. 5 is a diagram illustrating an example of an image. An image $G_1$ shown in FIG. 5 is generated on the basis of the image data acquired by the main control unit 110, and is a photograph image having a man and a woman as subjects. In this embodiment, as a coloring image generating target, a portrait image having relatively low edge intensity is used. When the edge calculating process starts, the main control unit 110 calculates the brightness value Y of the image $G_1$ (Step S131). Specifically, the main control unit converts R, G, and B raster data into YCbCr data, Lab data, or YIQ data having brightness components and color difference components to calculate the brightness value Y.

The main control unit 110 performs a dot removing process on the image $G_1$ (Step S132). The dot removing process sequentially multiplies the brightness value Y for the position (x, y) of each pixel of interest in the image $G_1$ by a Gaussian filter (blur filter) having a predetermined size (for example, 5×5 pixels, 7×7 pixels, and 9×9 pixels). In addition, a gamma process may be performed before and after the dot removing process.

After the dot removing process is performed (Step S132), the main control unit 110 performs an edge intensity calculating process (Step S133). In this embodiment, edge intensity is calculated by processing the brightness value Y of each pixel of the image $G_1$ with a Sobel filter. Next, edge intensity will be described. The Sobel filter multiplies nine brightness values around the position (x, y) of a pixel of interest by corresponding coefficients of a coefficient matrix in the horizontal direction and the vertical direction, and adds up the multiplied results. The multiplied results in the horizontal direction and the vertical direction are edge gradients dx and dy of the position (x, y) of the pixel of interest in the horizontal direction and the vertical direction. In this case, the edge at the pixel position (x, y) has a direction θ satisfying tan θ=dy/dx, and has a pixel position edge intensity S(x, y) represented by Expression 1 given below:

$$S(x,y)=\sqrt{(dx^2+dy^2)}.$$ [Expression 1]

In this embodiment, the Sobel filter is used for the edge intensity calculating process. However, various filters, such as a Prewitt filter and a Roberts filter, may be used.

Figure 6:
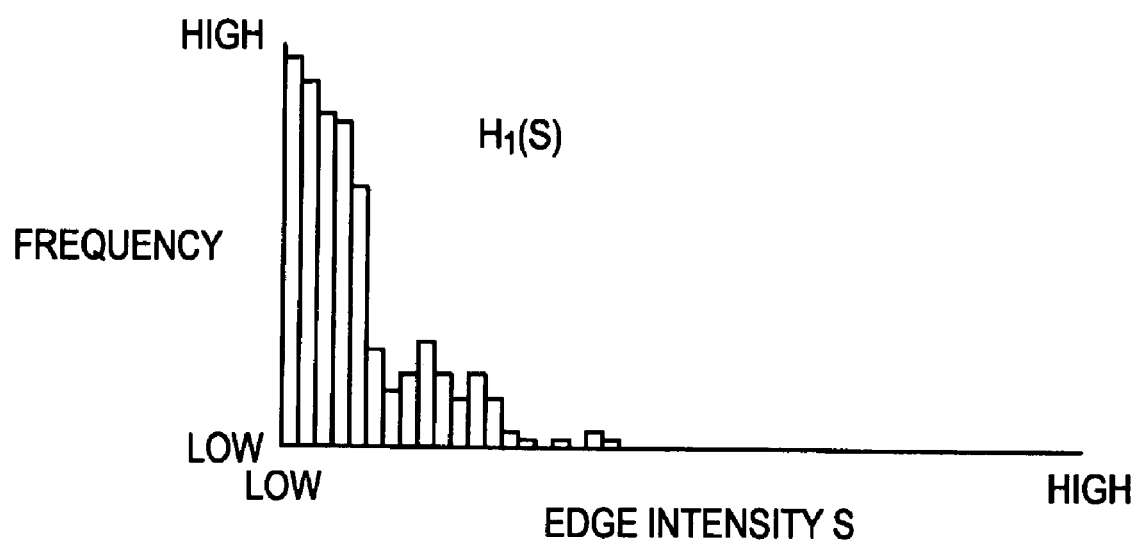
FIG. 6 is a diagram illustrating an edge intensity frequency distribution.

FIG. 6 is a diagram illustrating an example of an edge intensity frequency distribution. The main control unit 110 makes a histogram of edge intensity (Step S134). A frequency is calculated for the value of each pixel position edge intensity S(x, y), which is the edge intensity of the position (x, y) of each pixel in the image $G_1$ that is calculated by the edge intensity calculating process, and an edge intensity frequency distribution $H_1(S)$ of the image $G_1$ is made. In the edge intensity frequency distribution, the horizontal axis indicates edge intensity S, and the vertical axis indicates a frequency. FIG. 6 shows the edge intensity frequency distribution $H_1(S)$ of the image $G_1$. As shown in FIG. 6, there are a lot of pixels having low edge intensity S in an image having a small number of areas in which the brightness value varies rapidly, such as a portrait image, and the distribution is concentrated on a portion having low edge intensity S. In this embodiment, the edge intensity frequency distribution $H_1(S)$ is made by the pixel position edge intensity S(x, y) for each pixel. However, the image $G_1$ may be divided into small areas D each including a plurality of pixels, the edge intensity S(D) of each of the small areas D may be calculated by the cumulative value or the average value of the pixel position edge intensities S(x, y) of the small areas D, and the edge intensity frequency distribution $H_1(S)$ may be made on the basis of the edge intensity S(D). The edge calculating process is performed in this way.

Returning to FIG. 3, after the edge intensity calculating process is performed (Step S130), the main control unit 110 performs an edge intensity distribution determining process (Step S150). The edge intensity distribution determining process determines a threshold value Th for dividing a coloring image into a contour portion and a blank portion on the basis of the distribution state of the edge intensity frequency distribution $H_1(S)$ of the image $G_1$.

Figure 7:
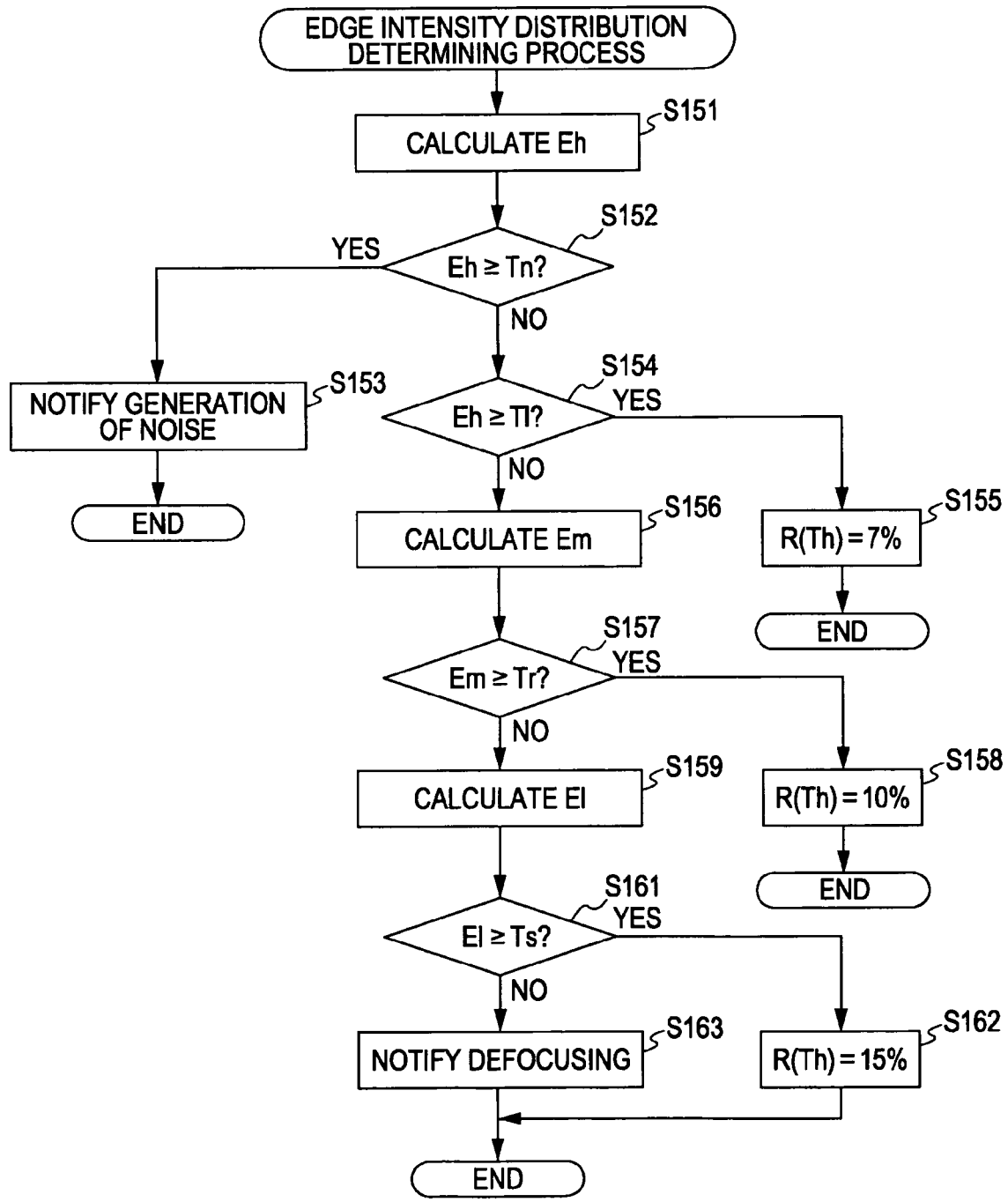
FIG. 7 is a flowchart illustrating an edge intensity distribution determining process.
Figure 8A:
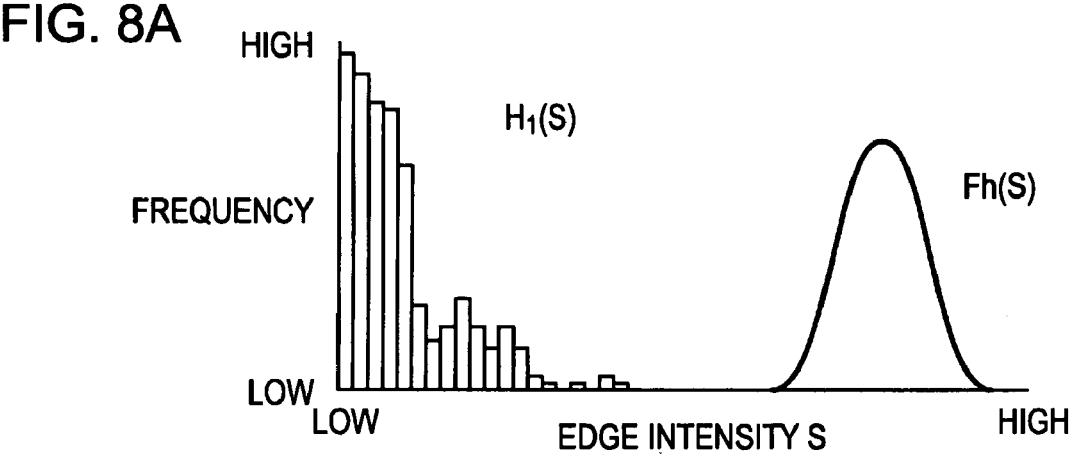
FIGS. 8A to 8C are diagrams schematically illustrating the edge intensity distribution determining process.
Figure 8B:
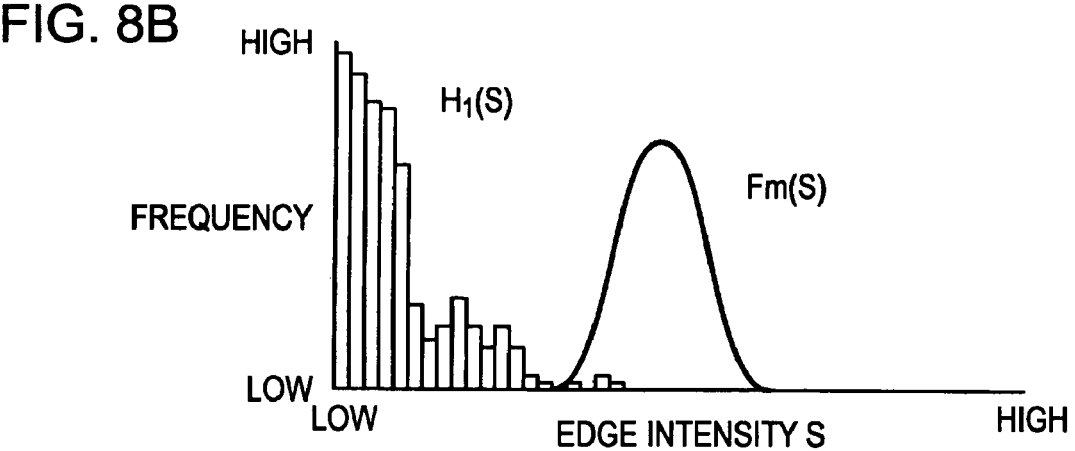
Figure 8C:
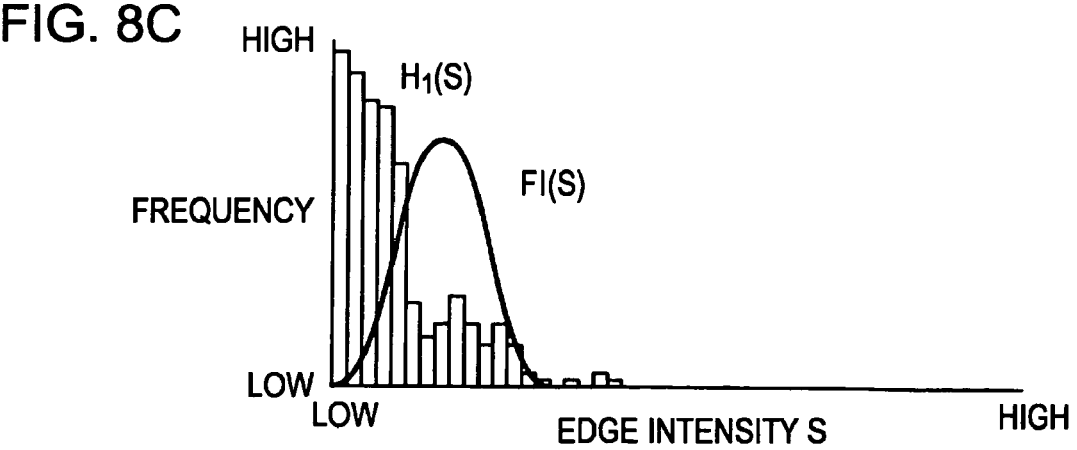
Figure 9:
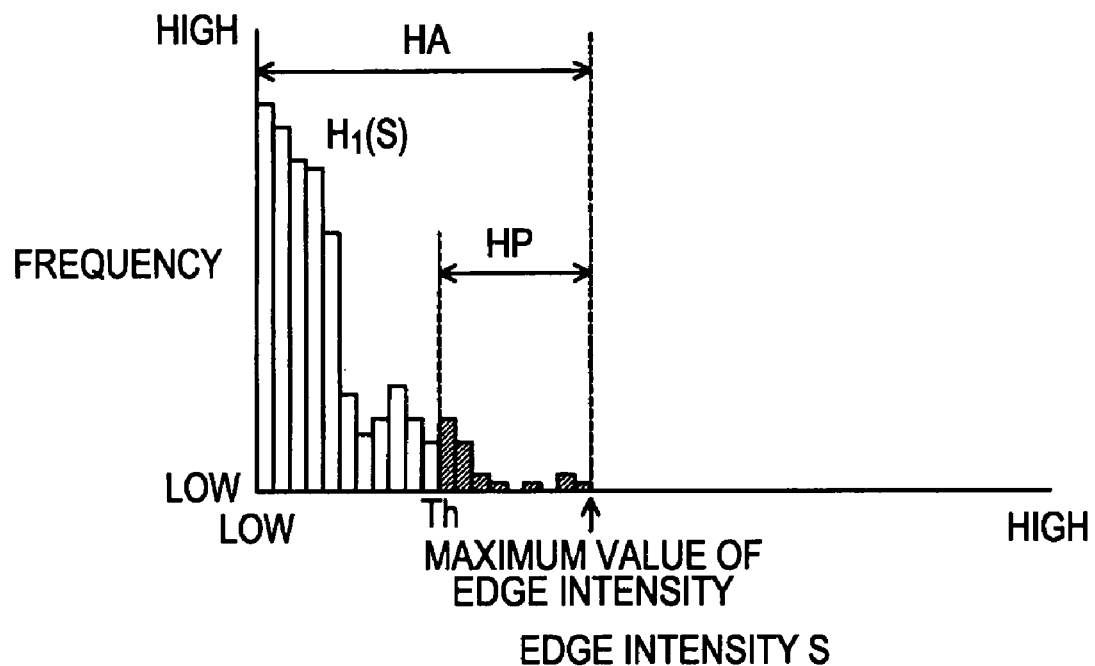
FIG. 9 is a diagram illustrating a method of setting a threshold value.

FIG. 7 is a flowchart illustrating the edge intensity distribution determining process. FIGS. 8A to 8C are diagrams schematically illustrating the edge intensity distribution determining process. FIG. 9 is a diagram illustrating a method of setting a threshold value.

The main control unit 110 calculates a line image characteristic value Eh used to determine whether the edge intensity frequency distribution $H_1(S)$ of the image $G_1$ is concentrated on a region having high edge intensity S (Step S151). The line image characteristic value Eh is calculated by the following Expression 2 using a line image determining filter Fh(S) which is a normal distribution function and in which a peak is disposed at the high level side of the edge intensity S as a weight such that the line image characteristic value is increased as the distribution is concentrated closer to the high level of the edge intensity S, as shown in FIG. 8A:

$$Eh = \Sigma H_1(S) \times Fh(S). \quad \text{[Expression 2]}$$

After calculating the line image characteristic value Eh, first, the main control unit 110 compares the line image characteristic value Eh with a noise determination threshold value Tn in order to determine whether the image $G_1$ has a large amount of noise and is suitable for a coloring image (Step S152). If Eh≧Tn (Step S152: YES), the image $G_1$ has an excessively large number of contour portions when the image $G_1$ is used as a coloring image. Therefore, the main control unit 110 determines that the image $G_1$ is not suitable for a coloring image. Then, the main control unit 110 displays a notice indicating that the image $G_1$ is not suitable for a coloring image on the display 160 (Step S153).

If Eh<Tn (Step S152: NO), the main control unit 110 compares the line image characteristic value Eh with a line image determination threshold value Tl in order to determine whether the image $G_1$ is close to a line image, such as an animation image (Step S154).

If Eh≧Tl (Step S154: YES), the main control unit 110 determines that the image $G_1$ is close to a line image, and sets a threshold value setting percentage R(Th) to 7%. The threshold value setting percentage R(Th) is a value used to determine the threshold value Th. As shown in FIG. 9, the threshold value setting percentage R(Th) is calculated by the following Expression 3 using a cumulative frequency HP (a hatched portion in FIG. 9) obtained by accumulating the frequencies from the maximum value of the edge intensity S to the threshold value Th of the edge intensity S in the edge intensity frequency distribution $H_1(S)$ and the total number of frequencies HA that is equal to the total number of pixels in the image $G_1$:

$$R(Th) = HP/HA. \quad \text{[Expression 3]}$$

As shown in FIG. 8A, since there is no distribution at the high level side of the edge intensity S in the image $G_1$, the line image characteristic value Eh is approximately zero and Eh≧Tl is not satisfied. Therefore, it is determined that the image is not close to a line image. For clarity of description, an image that is determined to be closed to a line image is exemplified below.

Figure 10:
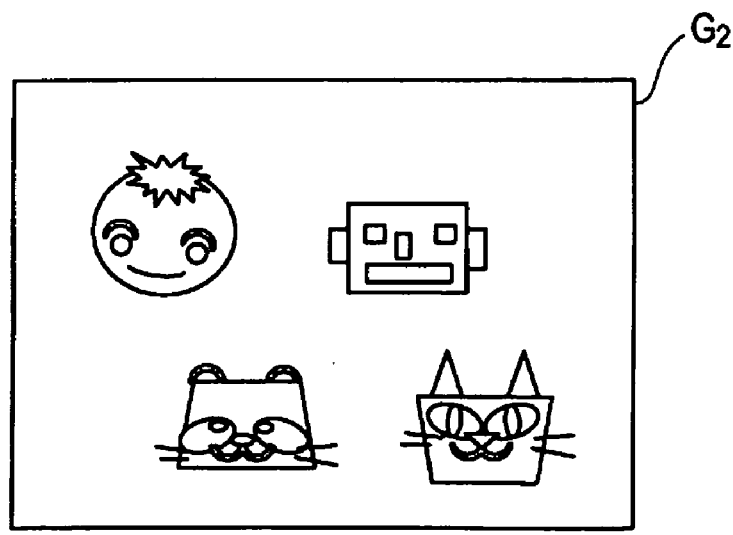
FIG. 10 is a diagram illustrating an example of a line image.
Figure 11:
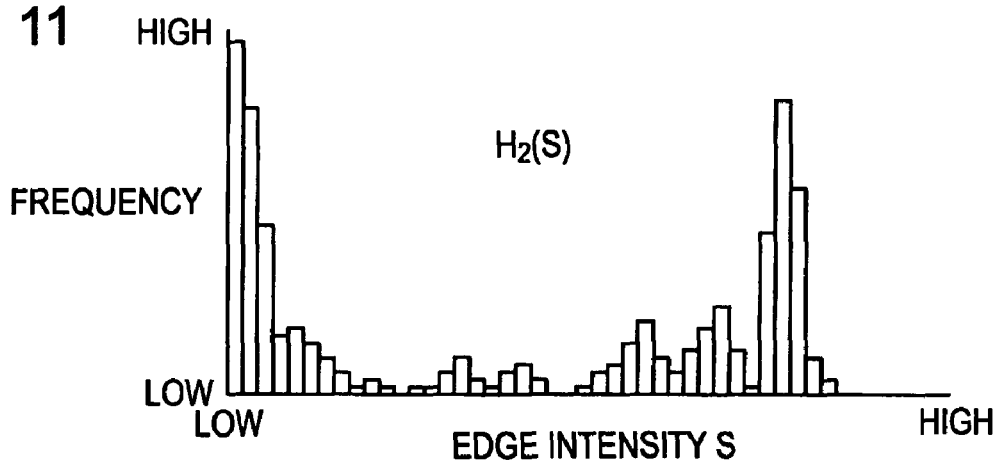
FIG. 11 is a diagram illustrating the edge intensity frequency distribution of a line image.
Figure 12:
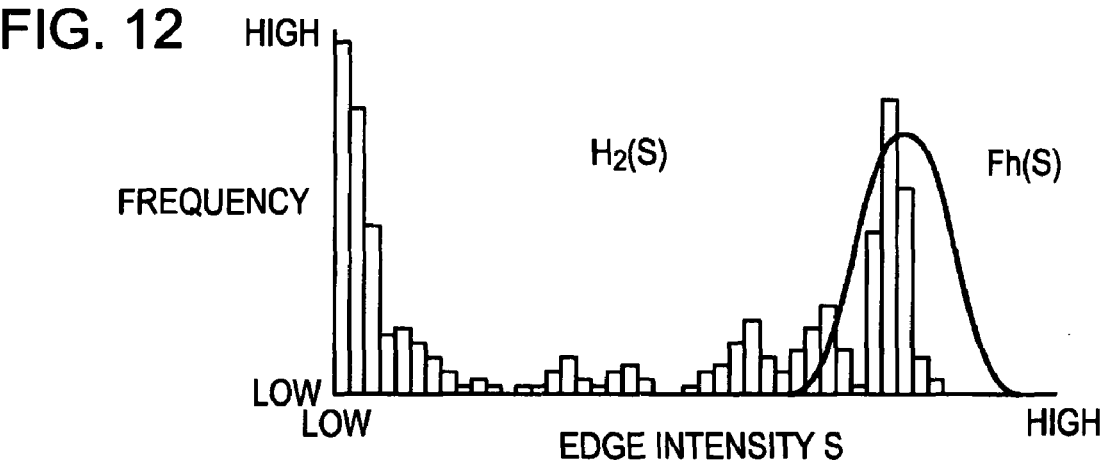
FIG. 12 is a diagram schematically illustrating the edge intensity distribution determining process of the line image.
Figure 13:
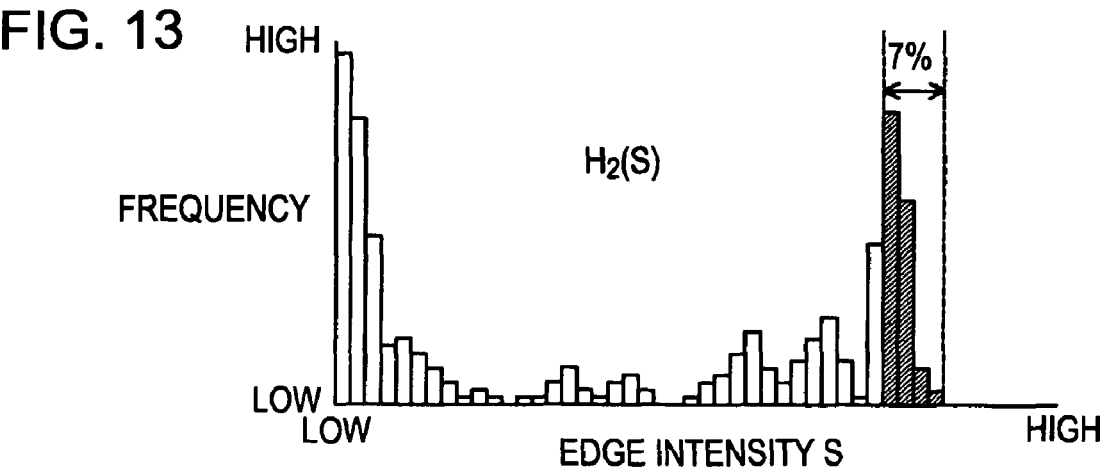
FIG. 13 is a diagram illustrating a method of setting the threshold value of the line image.

FIG. 10 is a diagram illustrating an example of a line image. FIG. 11 is a diagram illustrating the edge intensity frequency distribution of a line image. FIG. 12 is a diagram schematically illustrating a process of determining the edge intensity distribution of a line image. FIG. 13 is a diagram illustrating a method of setting the threshold value of a line image. In the line image $G_2$ shown in FIG. 10, the edge of an image relatively clearly appears. Therefore, as shown in FIG. 11, the edge intensity frequency distribution $H_2(S)$ of the line image $G_2$ has a peak at the high level size of the edge intensity S. In this case, as shown in FIG. 12, when the line image characteristic value Eh is calculated by multiplying the line image determining filter Fh(S) by the edge intensity frequency distribution $H_2(S)$, Eh≧Tl is satisfied. Therefore, as shown in FIG. 13, it is possible to set the threshold value Th around the peak of the frequency by setting the threshold value setting percentage R(Th) to 7%. The threshold value Th is for dividing a coloring image into a contour portion and a blank portion in a coloring image generating process, which will be described below.

Returning to FIG. 7, if Eh<Tl (Step S154: NO), the main control unit 110 calculates a high contrast image characteristic value Em used to determine whether the edge intensity frequency distribution $H_1(S)$ of the image $G_1$ is concentrated around the intermediate level of the edge intensity S (Step S156). The high contrast image characteristic value Em is calculated by the following Expression 4 using a high contrast image determining filter Fm(S) which is a normal distribution function and in which a peak is disposed in the vicinity of the intermediate level of the edge intensity S as a weight such that the high contrast image characteristic value is increased as the distribution is concentrated closer to the intermediate level of the edge intensity S, as shown in FIG. 8B:

$$Em = \Sigma H_1(S) \times Fm(S). \quad \text{[Expression 4]}$$

After calculating the high contrast image characteristic value Em, the main control unit 110 compares the high contrast image characteristic value Em with a high contrast image determination threshold value Tr (Step S157). If Em≧Tr (Step S157: YES), the main control unit 110 determines that the image $G_1$ is a high contrast image that is close to, for example, a landscape image. Then, the main control unit sets the threshold value setting percentage R(Th) to 10% and determines the threshold value Th.

As shown in FIG. 8B, since the distribution is small in the vicinity of the intermediate level of the edge intensity in the image $G_1$, Em≧Tr is not satisfied, and it is determined that the image is not a high contrast image close to, for example, a landscape image. For clarity of description, an image that is determined as a landscape image is exemplified below.

Figure 14:
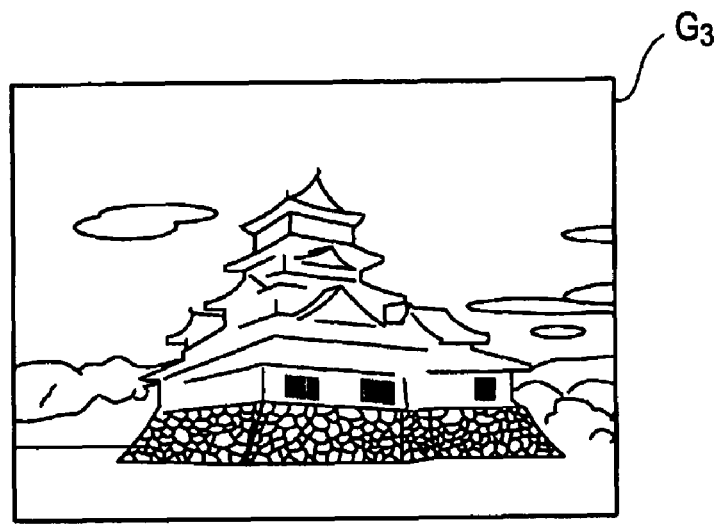
FIG. 14 is a diagram illustrating an example of a landscape image.
Figure 15:
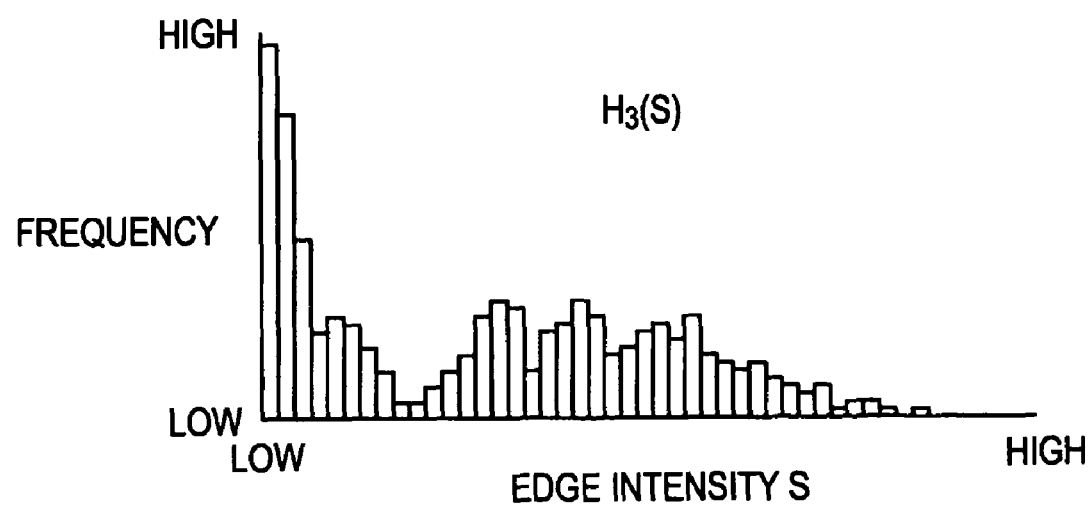
FIG. 15 is a diagram illustrating the edge intensity frequency distribution of the landscape image.
Figure 16:
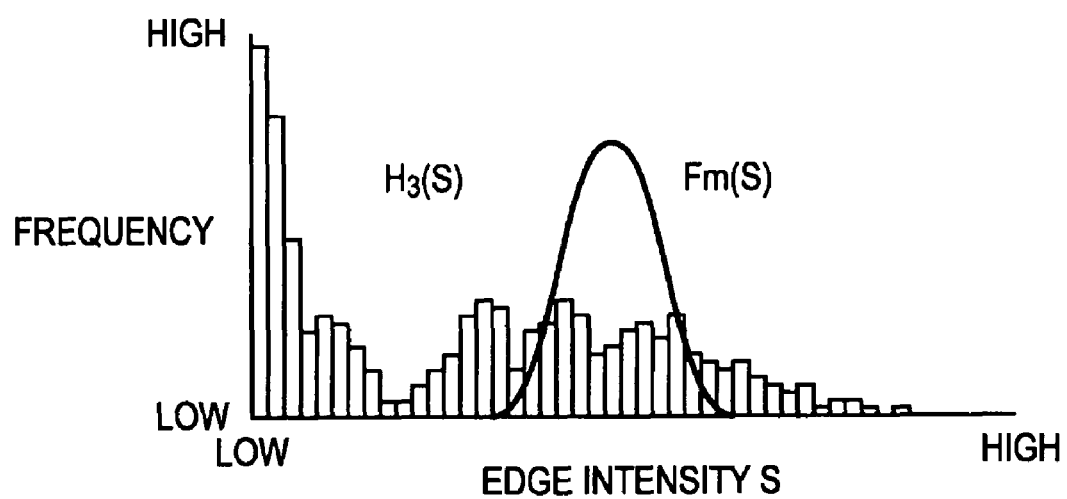
FIG. 16 is a diagram schematically illustrating the edge intensity distribution determining process of the landscape image.
Figure 17:
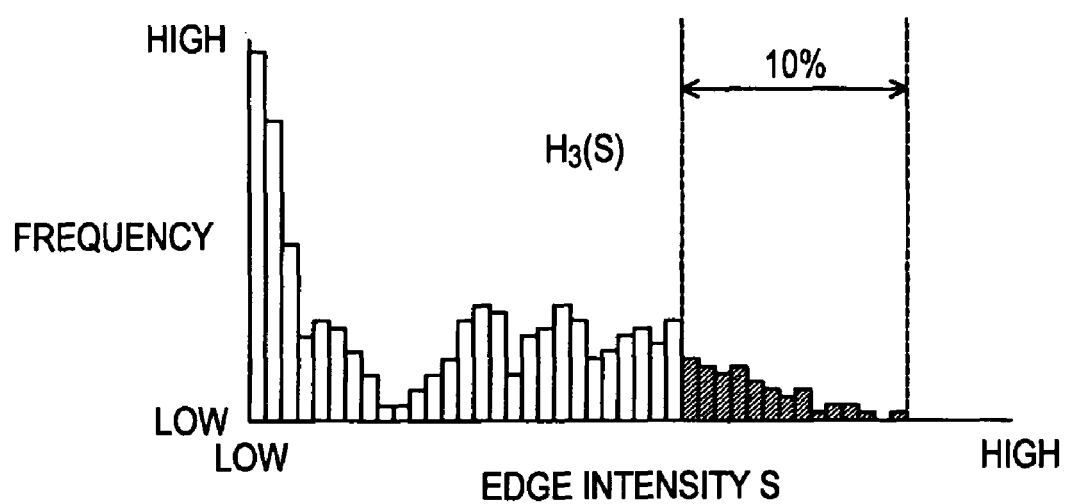
FIG. 17 is a diagram illustrating a method of setting the threshold value of the landscape image.

FIG. 14 is a diagram illustrating an example of a landscape image. FIG. 15 is a diagram illustrating the edge intensity frequency distribution of a landscape image. FIG. 16 is a diagram schematically illustrating a process of determining the edge intensity distribution of a landscape image. FIG. 17 is a diagram illustrating a method of setting the threshold value of a landscape image. In a line image $G_3$ shown in FIG. 14, the contour of an image, such as a photograph, is relatively clear. Therefore, as shown in FIG. 15, the edge intensity frequency distribution $H_3(S)$ of the line image $G_3$ has a high frequency in the vicinity of the intermediate level of the edge intensity. In this case, as shown in FIG. 16, when the high contrast image characteristic value Em is calculated by multiplying the high contrast image determining filter Fm(S) by the edge intensity frequency distribution $H_3(S)$, Em≧Tr is satisfied. Therefore, as shown in FIG. 17, it is possible to achieve a good balance between a contour portion for identifying the content of a landscape image and a blank portion for, for example, coloring by setting the threshold value setting percentage R(Th) to 10%.

Returning to FIG. 7, if Eh<Tri (Step S157: NO), the main control unit 110 calculates a low contrast image characteristic value El used to determine whether the edge intensity frequency distribution $H_1(S)$ of the image $G_1$ is concentrated at the low level side of the edge intensity (Step S159). The low contrast image characteristic value El is calculated by the following Expression 5 using a low contrast image determining filter Fl(S) which is a normal distribution function and in which a peak is disposed in the vicinity of the intermediate level of the edge intensity S as a weight such that the low contrast image characteristic value is increased as the distribution is concentrated closer to the low level of the edge intensity S, as shown in FIG. 8C:

$$El = \Sigma H_1(S) \times Fl(S). \quad \text{[Expression 5]}$$

After calculating the low contrast image characteristic value El, the main control unit 110 compares the low contrast image characteristic value El with a predetermined low contrast image determination threshold value Ts (Step S161). If El≧Ts (Step S161: YES), the main control unit 110 determines that the image $G_1$ is a low contrast image that is close to, for example, a portrait image. Then, the main control unit sets the threshold value setting percentage R(Th) to 15% and determines the threshold value Th.

As shown in FIG. 8C, since the distribution is concentrated at the low level side of the edge intensity in the image $G_1$, El≧Ts is satisfied, and it is determined that the image is a low contrast image close to, for example, a portrait image.

If El<Ts (Step S161: NO), the main control unit 110 determines that the image $G_1$ is a blurred image having low edge intensity, a contour for coloring does not appear even when the threshold value for dividing a contour portion and a blank portion is changed, and the image is not suitable for a coloring image. Therefore, the main control unit 110 displays a notice indicating that the image is not suitable for a coloring image on the display 160 (Step S163). In this way, the edge intensity distribution determining process is performed.

In this embodiment, as shown in FIGS. 8A to 8C, the line image determining filter Fh(S), the high contrast image determining filter Fm(S), and the low contrast image determining filter Fl(S) are normal distribution functions. However, they may be functions other than the above. In addition, as shown in FIGS. 8A to 8C, the distribution positions of the functions may not be particularly limited as long as the line image determining filter Fh(S), the high contrast image determining filter Fm(S), and the low contrast image determining filter Fl(S) are sequentially set from the high level side of the edge intensity S.

The noise determination threshold value Tn, the line image determination threshold value Tl, the high contrast image determination threshold value Tr, and the low contrast image determination threshold value Ts may be differently set when an image to be determined is read by the scanner 130 and when it is acquired from the memory card 810, the card slot 140 of the external apparatus 820, or the communication connector 150. Even when the image read by the scanner 130 and the image acquired from the memory card 810, the card slot 140 of the external apparatus 820, or the communication connector 150 have the same content, the edge intensity frequency distributions of the images are different from each other. Therefore, it is possible to set an appropriate threshold value by changing an input method to vary a set value. Specifically, distribution is likely to be generated on the high level side of the edge intensity in an image acquired by the scanner due to, for example, contamination during scanning, although the resolution of the image is low. Therefore, even when a distribution is on the high level side of the edge intensity, the threshold value setting percentage R(Th) is set to, for example, 10%, not 7%, to ensure a necessary contour portion, thereby clarifying the content of the image.

Returning to FIG. 3, after the edge intensity distribution determining process is performed (Step S150), the main control unit 110 performs a coloring image generating process (Step S170). The coloring image generating process generates a coloring image on the basis of the threshold value Th determined by the edge intensity distribution determining process.

Figure 18:
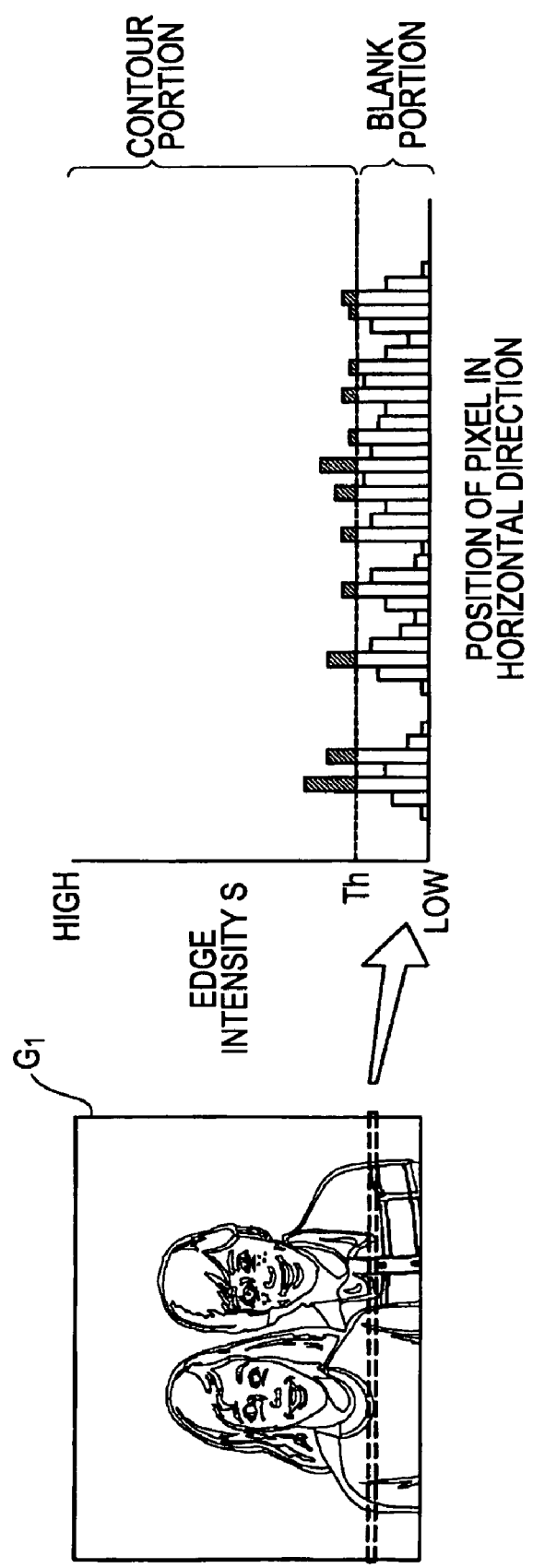
FIG. 18 is a diagram illustrating a method of dividing a coloring image into a contour portion and a blank portion on the basis of the threshold value.

FIG. 18 is a diagram illustrating a method of dividing a coloring image into a contour portion and a blank portion on the basis of a threshold value. As shown in FIG. 18, the main control unit 110 sequentially determines whether the pixel position edge intensity S(x, y) of the position (x, y) of each pixel of interest in the image $G_1$ is equal to or more than the threshold value Th. The main control unit generates a coloring image using the pixels having an intensity value that is equal to or greater than the threshold value as a contour portion and the pixels having an intensity value that is equal to or smaller than the threshold value Th as a blank portion. The contour portion is a line region for specifying the content of an image in the coloring image. During printing, the black (K) ejection head 211 ejects ink to the contour portion to form dots. The blank portion is for coloring in the coloring image, and during printing, no image is printed in the blank portion. In this embodiment, ink is uniformly ejected to the contour portion such that a contour has the same gradation level. However, the contour portion may have different gradation levels on the basis of the edge intensity S of each pixel. In addition, the contour portion may have a plurality of colors. In this embodiment, no image is printed in the blank portion. However, ink may be ejected to the blank portion to form dots therein such that coloring can be performed.

After performing the coloring image generating process (Step S170) to generate a coloring image, the main control unit 110 determines whether to print the coloring image (Step S180). The main control unit 110 controls the display 160 to display a screen for allowing the user to select the printing of the coloring image and receives a selection from the user. In this case, a preview of a coloring image may be displayed on the display 160, the threshold value setting percentage R(Th) may be increased or decreased by, for example, about ±3% according to the user's preference to set a new threshold value Th, and a coloring image may be generated again. When the user selects the end of printing (Step S180: NO), the coloring image generating process ends.

When the user selects to perform printing (Step S180: YES), the printing mechanism 120 prints the coloring image (Step S190). The main control unit 110 instructs the printing mechanism 120 to perform printing on the basis of the generated coloring image.

According to the printer 10 of the above-described first embodiment, a threshold value is set according to the distribution state of the edge intensity frequency distribution $H_1(S)$ of the image $G_1$. Therefore, it is possible to form a good coloring image. Among the coloring images including the contour portion and the blank portion, in a coloring image having a lot of contour portions, it is easy to specify the content of the image, but a blank portion is segmentalized. Therefore, the image is not suitable for a coloring image. In addition, in an image having a lot of blank portions, it is easy to perform coloring, but it is difficult to specify the content of the image. In the above-described embodiment of the invention, the threshold value setting percentage R(Th) varies depending on the distribution state of the edge intensity frequency distribution $H_1(S)$ of the image $G_1$. Therefore, even when the contour portion of an image close to a line image is reduced, it is easy to specify the content of the image. Therefore, it is possible to achieve a good balance between the contour portion and the blank portion in, for example, a photograph by reducing the contour portion, according to the content of an image, such as a landscape image or a portrait image, and specify the content of the image. As a result, it is possible to form a good coloring image having a consistent blank portion for coloring.

According to the printer 10 of the first embodiment, it is possible to determine image characteristics to set a threshold value. Therefore, it is possible to form a good coloring image. Specifically, it is possible to determine whether an image to be changed into a coloring image is close to a line image, a landscape image, or a portrait image to set a threshold value.

Therefore, it is possible to form a good coloring image.

The printer 10 according to the first embodiment uses the line image determining filter Fh(S), the high contrast image determining filter Fm(S), and the low contrast image determining filter Fl(S). Therefore, it is possible to form a good coloring image. Specifically, it is possible to set the threshold value setting percentage R(Th) on the basis of a determination value calculated by the line image determining filter Fh(S), the high contrast image determining filter Fm(S), and the low contrast image determining filter Fl(S). Therefore, it is possible to form a good coloring image.

According to the printer 10 of the first embodiment, the main control unit 110 automatically determines image characteristics on the basis of the line image determining filter Fh(S), the high contrast image determining filter Fm(S), and the low contrast image determining filter Fl(S) to generate a coloring image. Therefore, the user does not need to check the coloring image. In addition, an apparatus without the display 160 can also form a good coloring image.

The printer 10 according to the first embodiment determines image characteristics using the line image determining filter Fh(S), the high contrast image determining filter Fm(S), and the low contrast image determining filter Fl(S). Therefore, it is possible to determine whether an image is suitable for a coloring image and display a notice indicating whether the image is suitable for a coloring image.

According to the printer 10 of the first embodiment, the noise determination threshold value Tn, the line image determination threshold value Tl, the high contrast image determination threshold value Tr, and the low contrast image determination threshold value Ts can be differently set when an image to be determined is read by the scanner 130 and when it is acquired from the memory card 810, the card slot 140 of the external apparatus 820, or the communication connector 150. Therefore, it is possible to form a good coloring image by changing an image input method.

B. Modifications

Figure 19:
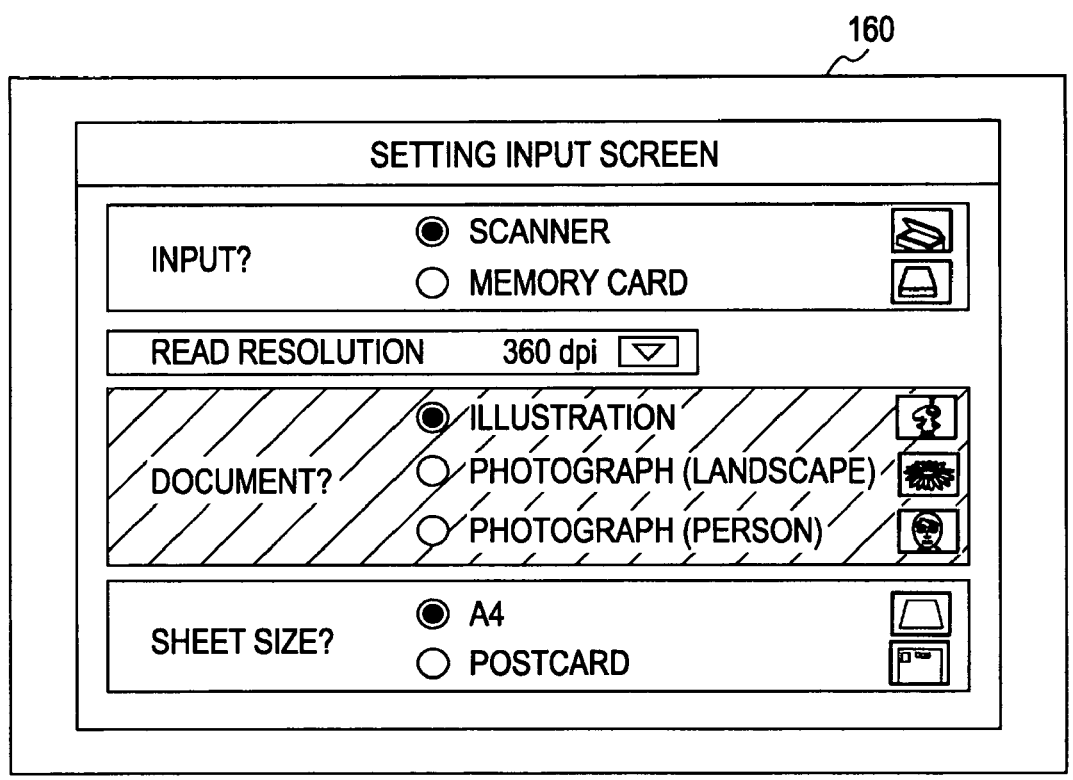
FIG. 19 is a diagram illustrating an example of a display screen of a display according to a modification.

FIG. 19 is a diagram illustrating an example of a display screen of the display according to a modification. In the above-described embodiment, the main control unit 110 determines the threshold value setting percentage R(Th) of an image on the basis of the line image determining filter Fh(S), the high contrast image determining filter Fm(S), and the low contrast image determining filter Fl(S). However, as shown in FIG. 19, the main control unit may display the kind of document on the display 160 such that the user can use the control panel 170 to select the type of document, thereby determining the threshold value setting percentage R(Th).

In the above-described embodiment, the threshold value setting percentage R(Th) is set to 7%, 10%, or 15%, but the invention is not limited thereto. The threshold value setting percentage R(Th) may be set to other values. In addition, the threshold value setting percentage R(Th) is not limited to three values of 7%, 10%, and 15%, but it may have four or more values, or two or less values. In addition, the threshold value setting percentage R(Th) may be continuously changed.

In the above-described embodiment, in the edge calculating process, image processing, such as a dot removing process, is performed. However, image processing may not be necessarily performed. For example, image processing may be performed only when the user inputs instructions. In addition, the printer 10 does not necessarily have an image processing function.

In the above-described embodiment, the invention is applied to a printer. However, as other embodiments, the invention may be applied to, for example, electronic apparatuses dealing with image data, such as a personal computer, a digital camera, and a viewer.

What is claimed is:

1. A coloring image generating apparatus comprising:
an acquiring unit that acquires an image;
an edge intensity calculating unit that calculates an edge intensity frequency distribution of the image;
a threshold value setting unit that sets a threshold value for dividing a coloring image into a contour portion and a blank portion according to distribution characteristics of the edge intensity frequency distribution; and
a generating unit that discriminates the contour portion from the blank portion in the image on the basis of the threshold value and generates a coloring image;
wherein, when a distribution is concentrated on a high edge intensity region in the edge intensity frequency distribution, the threshold value setting unit sets the threshold value such that the contour portion is reduced, and
when the distribution is concentrated on a low edge intensity region, the threshold value setting unit sets the threshold value such that the contour portion is increased.

2. The coloring image generating apparatus according to claim 1,
wherein the generating unit generates the coloring image using a portion of the image having an edge intensity that is more than the threshold value as the contour portion and another portion of the image having an edge intensity that is less than the threshold value as the blank portion.

3. A coloring image generating apparatus comprising:
an acquiring unit that acquires an image;
an edge intensity calculating unit that calculates an edge intensity frequency distribution of the image;
a threshold value setting unit that sets a threshold value for dividing a coloring image into a contour portion and a blank portion according to distribution characteristics of the edge intensity frequency distribution; and
a generating unit that discriminates the contour portion from the blank portion in the image on the basis of the threshold value and generates a coloring image;
wherein the threshold value setting unit includes a plurality of set values each indicating a percentage of a cumulative value of frequencies in the edge intensity frequency distribution from a maximum value of the edge intensity to the threshold value in a total number of frequencies in the edge intensity frequency distribution, and
the threshold value setting unit selects one of the set values according to the distribution characteristics of the edge intensity frequency distribution, thereby setting the threshold value.

4. The coloring image generating apparatus according to claim 3,
wherein the threshold value setting unit selects the set value on the basis of a determination value obtained by applying a determining filter to the edge intensity frequency distribution.

5. A coloring image generating apparatus comprising:
an acquiring unit that acquires an image;
an edge intensity calculating unit that calculates an edge intensity frequency distribution of the image;
a threshold value setting unit that sets a threshold value for dividing a coloring image into a contour portion and a blank portion according to distribution characteristics of the edge intensity frequency distribution; and a generating unit that discriminates the contour portion from the blank portion in the image on the basis of the threshold value and generates a coloring image;

wherein the acquiring unit acquires the image using a plurality of input units, when the image is acquired by a scanner, the threshold value setting unit sets the threshold value such that the contour portion is larger than those when the image is acquired by the other input units.

6. The coloring image generating apparatus according to claim 4, wherein the threshold value setting unit determines whether the image is suitable for a coloring image on the basis of the determination value.

7. A coloring image generating method comprising:
acquiring an image;
calculating an edge intensity frequency distribution of the image;
setting a threshold value for dividing a coloring image into a contour portion and a blank portion according to distribution characteristics of the edge intensity frequency distribution; and
discriminating the contour portion from the blank portion in the image on the basis of the threshold value and generating a coloring image;
wherein when a distribution is concentrated on a high edge intensity region in the edge intensity frequency distribution, the threshold value is set such that the contour portion is reduced, and
when the distribution is concentrated on a low edge intensity region, the threshold value is set such that the contour portion is increased.

8. The coloring image generating method according to claim 7, wherein generating the coloring image comprises using a portion of the image having an edge intensity that is more than the threshold value as the contour portion and another portion of the image having an edge intensity that is less than the threshold value as the blank portion.

9. A coloring image generating method comprising:
acquiring an image;
calculating an edge intensity frequency distribution of the image;
setting a threshold value for dividing a coloring image into a contour portion and a blank portion according to distribution characteristics of the edge intensity frequency distribution; and
discriminating the contour portion from the blank portion in the image on the basis of the threshold value and generating a coloring image;
wherein setting the threshold value comprises selecting one of a plurality of set values according to the distribution characteristics of the edge intensity frequency distribution, each of the plurality of set values indicating a percentage of a cumulative value of frequencies in the edge intensity frequency distribution from a maximum value of the edge intensity to the threshold value in a total number of frequencies in the edge intensity frequency distribution.

10. The coloring image generating method according to claim 9, wherein generating the coloring image comprises using a portion of the image having an edge intensity that is more than the threshold value as the contour portion and another portion of the image having an edge intensity that is less than the threshold value as the blank portion.

11. The coloring image generating method according to claim 9, wherein the set value is selected on the basis of a determination value obtained by applying a determining filter to the edge intensity frequency distribution.

12. coloring image generating method according to claim 11, further comprising determining whether the image is suitable for a coloring image on the basis of the determination value.

13. A coloring image generating method comprising:
acquiring an image;
calculating an edge intensity frequency distribution of the image;
setting a threshold value for dividing a coloring image into a contour portion and a blank portion according to distribution characteristics of the edge intensity frequency distribution; and
discriminating the contour portion from the blank portion in the image on the basis of the threshold value and generating a coloring image;
wherein acquiring the image comprises using a plurality of input units,
when the image is acquired by a scanner, the threshold value is set such that the contour portion is larger than when the image is acquired by the other input units.

14. The coloring image generating method according to claim 13, wherein generating the coloring image comprises using a portion of the image having an edge intensity that is more than the threshold value as the contour portion and another portion of the image having an edge intensity that is less than the threshold value as the blank portion.

15. The coloring image generating apparatus according to claim 3, wherein the generating unit generates the coloring image using a portion of the image having an edge intensity that is more than the threshold value as the contour portion and another portion of the image having an edge intensity that is less than the threshold value as the blank portion.

16. The coloring image generating apparatus according to claim 5, wherein the generating unit generates the coloring image using a portion of the image having an edge intensity that is more than the threshold value as the contour portion and another portion of the image having an edge intensity that is less than the threshold value as the blank portion.

* * * * *